Oct. 14, 1930.  W. G. KIRCHHOFF  1,778,363
DOUGH MIXER
Filed Oct. 15, 1924
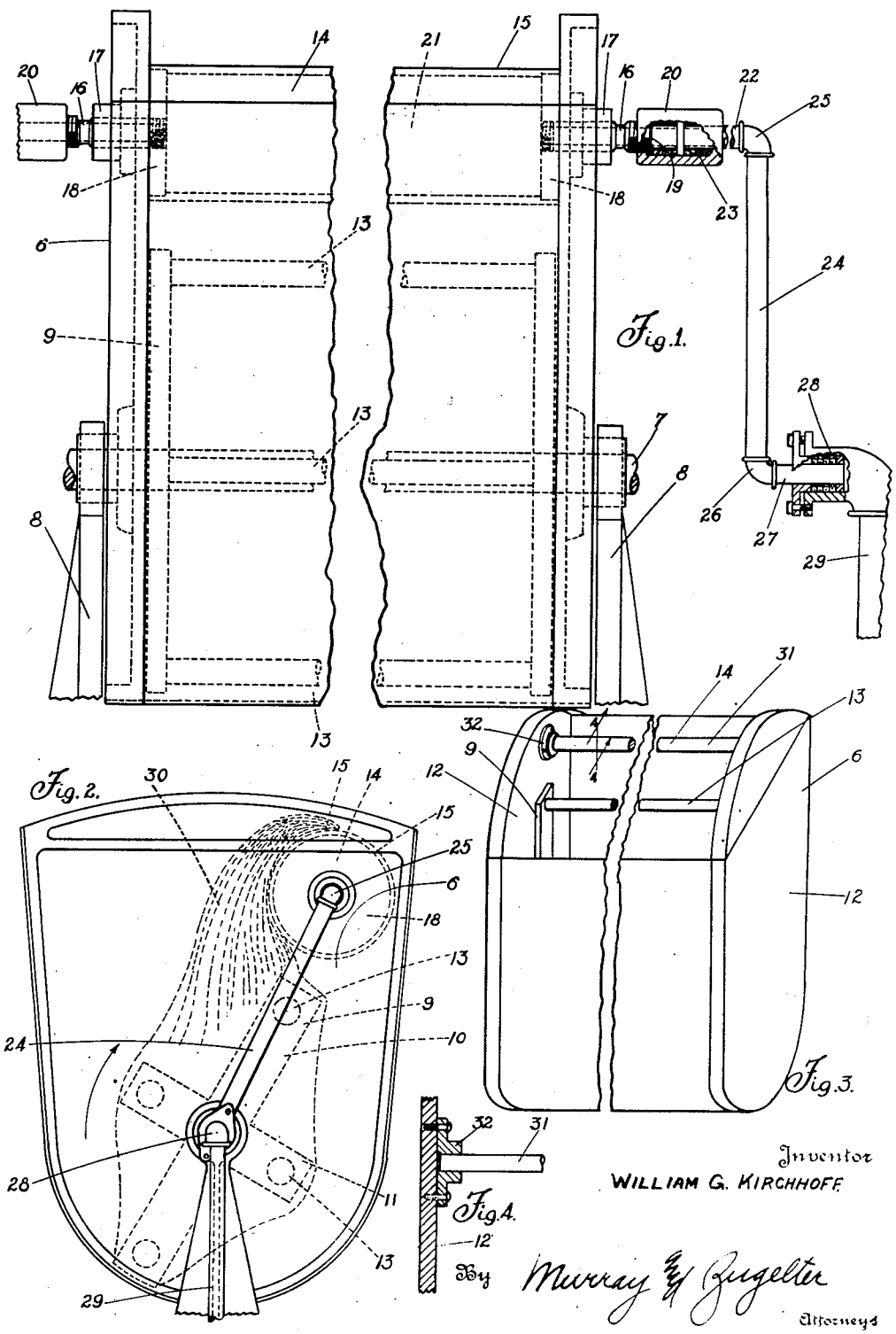
Inventor
WILLIAM G. KIRCHHOFF
By Murray & Zugelter
Attorneys Patented Oct. 14, 1930

1,778,363

UNITED STATES PATENT OFFICE

WILLIAM G. KIRCHHOFF, OF CINCINNATI, OHIO

DOUGH MIXER

Application filed October 15, 1924. Serial No. 743,796.

An object of my invention is to provide means for a doughmixer whereby the dough in process of mixing will be precluded from undue rise in temperature by reason of excessive impact and friction by the dough upon the walls of the mixing bin.

Another object is to provide a device for the purpose stated which will intercept the mass of dough as it is moved by rotating paddles or dough agitating means.

Another object is to provide means for the purpose stated which is simple of construction and efficient in operation.

These and other objects are attained by the means described herein and disclosed in the accompanying drawings, in which:

Fig. 1 is a fragmental front elevation of a dough mixing bin having embodied therein a device of my invention.

Fig. 2 is a side elevation of the device looking to the left on Fig. 1.

Fig. 3 is a perspective view of a dough mixing bin showing another form of my invention.

Fig. 4 is a cross sectional view taken on line 4—4 of Fig. 3.

The mixing bin 6 as disclosed is of a type adapted to be tilted for removing the contents thereof. The bin 6 is suitably supported upon a shaft 7 supported by suitable bearings upon uprights 8 and any approved tilting mechanism such as a hand wheel and train of gears, (not shown) may be employed for the purpose of tilting the bin 6. An agitating means or paddle structure 9 comprises a pair of long arms 10 and a pair of relatively shorter arms 11 mounted for rotation upon the shaft 7 adjacent the end walls 12 of the bin, and carrying suitable cross arms or blades 13. The paddle structure 9 is adapted to be revolved within the bin or tank 6 by means of the ordinary rotating shaft 7 driven from a suitable source of power (not shown). The dough intercepting means 14 is adapted to extend across the tank 6 and to have its opposite ends mounted for free rotation upon the opposite end walls 12 of the tank 6. As disclosed in Fig. 1 the intercepting means 14 comprise a hollow cylinder or drum 15 mounted on its opposite end on suitable tubular drum shafts 16 carried by bearings 17 mounted on the end walls 12. One end of each tubular shaft 16 is threadedly mounted in the heads 18 of the cylinder 15 while the other end 19 is provided with threads for engaging the inner threaded walls of a water tight coupling 20 by means of which the chamber 21 in the drum 15 is placed in communication with a water pipe 22. Suitable packing 23 is placed within the coupling 20 which is tightly drawn up on the shaft 16 so that the drum 15, shaft 16, and coupling 20 will be free to revolve as a unit upon the bearings 17 and about the end of the pipe 22. In order that water or cooling fluid may be directed to the drum 15 and at the same time accommodate the tilting of the tank 6 its axis on the shaft 7 and water pipe 24 is mounted at its one end at right angles to the pipe 22 by means of a suitable elbow 25 and is provided at its opposite end with an elbow 26 which is positioned in axial alignment with the shaft 7 and carries a stem or gland 27 revolubly mounted within a suitably packed water tight joint 28. By means of the structure just described a cooling fluid from a suitable supply pipe 29 may circulate through the joint 28, pipes 24 and 22 through the coupling 20 and tubular shaft 16 and into the drum 15 and out through a similar structure on the other side of the tank. In this way a drum of considerable area may be kept in a chilled condition through the agency of flow of the cooling fluid so that when a mass of dough 30 is brought into contact therewith by the rapidly revolving paddle structure 9 the dough 30 will not become heated as a result of its impact and frictional engagement upon the drum 15.

In Figs. 3 and 4 is shown another form of intercepting device in which the area upon the interceptor 14 is very small and for this reason the water cooling means has been eliminated. In this form the drum 15 is supplanted by a single roller 31 which is mounted for free rotation upon suitable flanges 32 mounted on the end walls 12 of the tank 6. In operation, flour and water and the various ingredients for dough are placed in the tank 6 and the paddle structure 9 is revolubly actuated therein, whereupon the ingredients will soon form a plastic substance in which there is great cohesion. The paddle structure 9, revolving in the direction of the arrow as shown in Fig. 2, will cause that portion of the dough carried by the longer arms 10 to be subjected to considerable centrifugal force which causes the mass of dough to stretch upwardly and outwardly and to be carried into contact with the interceptor 14. The interceptor being freely revoluble, will turn and thus eliminate the heat which would be incident to the impact and friction which would occur if the mass of dough were permitted to strike a large area of the sides of the bin 6. In this way the mass of dough is alternately stretched through the agency of centrifugal force and permitted to return to the paddle structure 9 when the centrifugal force is broken through the agency of the interceptor 14, without the resultant rise in temperature which would occur in the absence of the interceptor 14. The engagement or wrapping of the dough upon the interceptor also provides an additional stretching for said dough as the paddle mechanism moves away from the interceptor and pulls the mass of dough away from the interceptor.

As will be noted in the drawings, the interceptor is positioned at a distance from the end of the long arms 10 and at one side of the mouth or opening of the tank 6 in order that the tank may be tilted to the opposite side for removing the finished dough.

What I claim is:

1. In a device of the class described the combination with a mixing tank, of a revoluble paddle structure for stretching a cohesive plastic substance through the agency of centrifugal force, and a straight rotatable bar adjacent the paddle structure and without the orbit of the paddle for intercepting the stretched portion of the plastic whereby the stretched portion of the plastic is permitted to return to the paddle structure through the agency of its cohesive qualities without severing the plastic substance from the paddle means.

2. In a device of the class described the combination with a mixing tank for cohesive plastic substances, of rotatory paddle means for exerting centrifugal force upon the plastic whereby the plastic is stretched within the tank, and a freely revoluble straight bar adjacent the paddle means and disposed outwardly beyond the orbit of the paddle means, for intercepting the stretched portion of the plastic whereby said stretched portion of the plastic is permitted to return to the paddle means without severing the plastic substance from the paddle means.

3. In a device of the class described the combination of a mixing tank, paddle means revolubly mounted in the tank for carrying a plastic and for stretching said plastic through the agency of centrifugal force, a drum mounted adjacent the orbit of the paddle, and means for directing a cooling medium through the drum whereby to counteract heat resultant from the impact and contact of dough upon the drum.

4. In a device of the class described the combination of a mixing tank, paddle means revolubly mounted in the tank for carrying a plastic and for stretching said plastic through the agency of centrifugal force, a freely revoluble drum mounted adjacent the orbit of the paddle means, and means for directing a cooling fluid through the drum whereby to counteract heat resultant from the impact and contact of dough from the paddle means upon the drum.

5. In a device of the class described the combination of a tiltable mixing tank, revoluble paddle means in the mixing tank for exerting centrifugal force upon a mass of dough in the tank whereby the dough is stretched, of a hollow intercepting means for engaging the dough as it is stretched from the paddle means, and revolubly mounted means for directing fluid to the intercepting means whereby the fluid conveying means may be revolubly actuated when the tank is tilted.

6. In a device of the class described the combination of a tiltable mixing tank, revoluble paddle means in the mixing tank for exerting centrifugal force upon a mass of dough in the tank whereby the dough is stretched, freely revoluble fluid cooled intercepting means for engaging the dough as it is stretched from the paddle means, and revolubly mounted means for conveying fluid to the intercepting means whereby the fluid conveying means may be revolubly actuated when the tank is tilted.

7. In a dough mixer, the combination of a mixing tank, rotatable agitating means in the tank, and a hollow intercepting means adjacent the rotatable agitating means and without the orbit of said agitating means, and means for directing a temperature controlling medium to the hollow intercepting means.

8. In a dough mixer, the combination of a mixing tank comprising a semi-cylindrical bottom, sides extending from the bottom, and oppositely disposed ends, a paddle disposed between the ends adapted for rotation in and adjacent the semi-cylindrical bottom of the tank, an intercepting means disposed above the paddle and extending between the ends of the tank and spaced from the sides of the tank and serving as an intercepter for dough stretching upwardly from the paddle as a result of centrifugal force operative upon the dough resultant from rotatory action of the paddle, and means for cooling the intercepting means.

9. In a device of the class described the combination of a mixing tank, a revolving agitator within the tank for mixing dough and for exerting centrifugal force upon the dough for stretching the dough, and a freely revoluble straight interceptor bar for checking the movement of the dough under the influence of centrifugal action and for returning the dough to the agitator without severing the dough from the agitator.

10. In a device of the class described the combination of a mixing tank, a revolving agitator within the tank, the agitator being adapted for mixing dough and for exerting centrifugal force upon the dough within the tank and a freely revoluble straight interceptor bar within the tank and spaced from the agitator and disposed in a position for contacting dough as it moves from the agitator under the influence of centrifugal force, for precluding contact of such dough with the wall of the tank and for returning the dough to the agitator without severing the dough from the agitator.

11. In a device of the class described the combination of a dough mixing tank, a revolving agitator within the tank adapted to act upon dough and a straight interceptor bar in the tank having fixed bodily spaced relation to the agitator and adapted to intercept contact of the dough with the tank wall as the dough is moved by the agitator.

12. The steps in the process of dough mixing occurring subsequent to the agitation of the dough ingredients in order to bring them to a consistency to require kneading, which consists, during the kneading stage, in rotating and agitating the dough in a mass within a receptacle and deflecting the dough mass away from frictional engagement with a wall of the receptacle in which the kneading is being carried out, against which wall the combined centrifugal forces of rotation acting thereon would tend to project said dough mass, thereby preventing overheating of said dough mass.

13. The steps in the process of dough mixing occurring subsequent to the agitation of the dough ingredients in order to bring them to a consistency to require kneading, which consists, during the kneading stage, in rotating and agitating the dough in a mass within a receptacle and deflecting the dough mass away from frictional engagement with a wall of the receptacle in which the kneading is being carried out, against which wall the combined centrifugal forces of rotation acting thereon would tend to project said dough mass, and enforcing an air space for the cooling action thereof between the said wall and the rotating dough mass, thereby preventing overheating of said dough mass.

In testimony whereof, I have hereunto subscribed my name this 13th day of October, 1924.

WILLIAM G. KIRCHHOFF.